US008395548B2

(12) United States Patent
Hsu et al.

(10) Patent No.: US 8,395,548 B2
(45) Date of Patent: Mar. 12, 2013

(54) MOBILE APPARATUS

(75) Inventors: Hsien-Tsung Hsu, Taipei (TW); Po-Min Lin, Yingge Township, Taipei County (TW); Yi-Hsueh Tsai, Banqiao (TW)

(73) Assignee: Institute for Information Industry, Taipei (TW)

( * ) Notice: Subject to any disclaimer, the term of this patent is extended or adjusted under 35 U.S.C. 154(b) by 223 days.

(21) Appl. No.: 12/965,087

(22) Filed: Dec. 10, 2010

(65) Prior Publication Data

US 2012/0133556 A1    May 31, 2012

(30) Foreign Application Priority Data

Nov. 25, 2010   (TW) ................................ 99140738 A (51) Int. Cl.
*G01S 3/02* (2006.01)
(52) U.S. Cl. ...................................................... 342/458
(58) Field of Classification Search .................... 342/458
See application file for complete search history.

(56) References Cited

U.S. PATENT DOCUMENTS

2009/0316601 A1*  12/2009  Zhu et al. ...................... 370/254

* cited by examiner

*Primary Examiner* — Harry Liu
(74) *Attorney, Agent, or Firm* — Ping Wang; Andrews Kurth, LLP (57) ABSTRACT

A mobile apparatus is provided. The mobile apparatus comprises a transceiver and a processor. The transceiver receives a nearby signal from a nearby mobile apparatus, wherein the nearby signal carries a nearby positioning information. The processor electrically connected to the transceiver estimates a nearby received signal strength of the nearby signal according to the nearby signal, and generates a host positioning information according to the nearby received signal strength and the nearby positioning information.

17 Claims, 9 Drawing Sheets

MOBILE APPARATUS

This application claims the benefit of priority based on Taiwan Patent Application No. 099140738 filed on Nov. 25, 2010, which is hereby incorporated by reference in its entirety.

FIELD

The present invention relates to a mobile apparatus. More particularly, the mobile apparatus of the present invention can generate a host positioning information according to a received signal strength of a signal received from a nearby mobile apparatus and a positioning information of the nearby mobile apparatus so as to know a position of itself. Thereby, even when without having a positioning device, the mobile apparatus can still acquire the positioning information of itself by means of the nearby mobile apparatus.

BACKGROUND

Owing to development of science and technology, more and more mobile apparatuses are now equipped with a position device, which can acquire positioning information by means of the Global Positioning System (GPS) technology, the Assisted Global Positioning System (AGPS) technology, the Wi-Fi technology or the Global Navigation Satellite System (GNSS) technology so as to know a position where the mobile apparatus is located.

Unfortunately, mobile apparatuses currently available cannot exchange positioning information with each other to improve the positioning accuracy and efficiency, so all the positioning operations of such a mobile apparatus must be accomplished by the mobile apparatus's own positioning device. This leads to relatively long time required for the positioning and also relatively large power consumption. For example, when the GPS or GNSS technology is adopted, the positioning device of the mobile apparatus has to spend much time on pre-processes; and when the AGPS technology is adopted, a network bandwidth of a base station (BS) will necessarily be occupied by the mobile apparatus, so the BS must provide more network bandwidth resources in order to serve a large amount of mobile apparatuses.

Furthermore, a mobile apparatus equipped with a positioning device is also unable to provide the positioning information to nearby mobile apparatuses without having a positioning device for purpose of sharing the resources. Consequently, a user in need of the positioning service can only choose to buy an expensive mobile apparatus equipped with a positioning device.

Accordingly, efforts still have to be made in the art to improve the positioning accuracy and timeliness of mobile apparatuses and allow for sharing of positioning information with nearby mobile apparatuses.

SUMMARY

An objective of the present invention is to provide a mobile apparatus, which can acquire positioning information of a nearby mobile apparatus and derive positioning information of itself based on the positioning information of the nearby mobile apparatus and the received signal strength.

To achieve the aforesaid objective, the present invention discloses a mobile apparatus, which comprises a transceiver and a processor. The transceiver is configured to receive a nearby signal from a nearby mobile apparatus. The nearby signal carries nearby positioning information. The processor, which is electrically connected to the transceiver, is configured to estimate a nearby received signal strength of the nearby signal according to the nearby signal and generate a host positioning information according to the nearby received signal strength and the nearby positioning information.

Another objective of the present invention is to provide a mobile apparatus, which can provide positioning information to nearby mobile apparatuses so that the nearby mobile apparatuses can respectively derive positioning information of themselves based on the positioning information and the received signal strength.

To achieve the aforesaid objective, the present invention further discloses a mobile apparatus, which comprises a positioning device and a transceiver. The positioning device is configured to generate a original host positioning information. The transceiver is configured to transmit a host signal to a nearby mobile apparatus. The host signal carries the original host positioning information so that the nearby mobile apparatus estimates received signal strength of the host signal according to the host signal and generates a nearby positioning information according to the received signal strength and the original host positioning information.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a mobile apparatus. The mobile apparatus of the present invention is able to acquire positioning information of a nearby mobile apparatus and derive positioning information of itself according to the positioning information of the nearby mobile apparatus and the received signal strength. Description of the following embodiments is only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
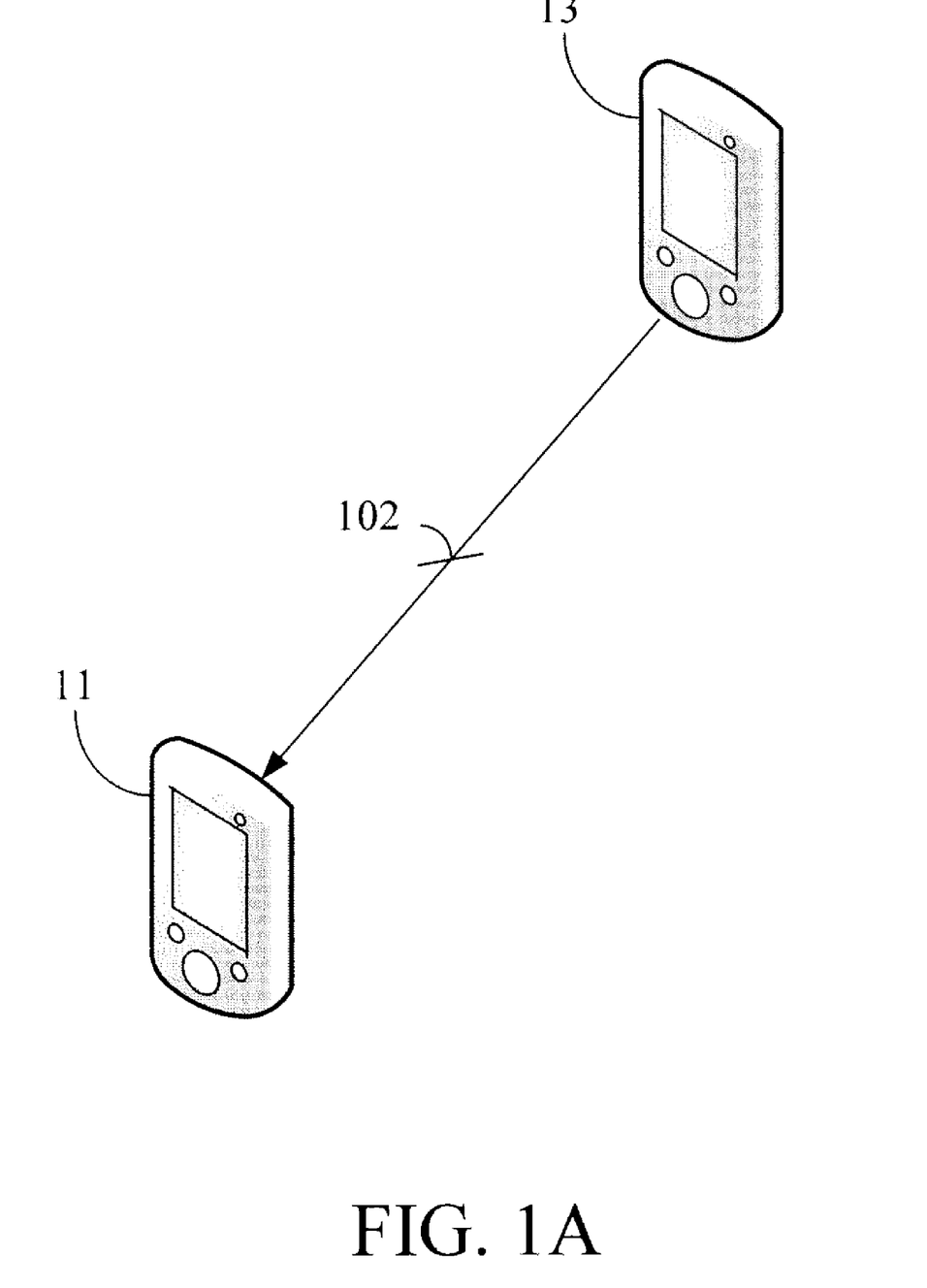
FIGS. 1A-1C are schematic views of a first embodiment of the present invention.
Figure 1B:
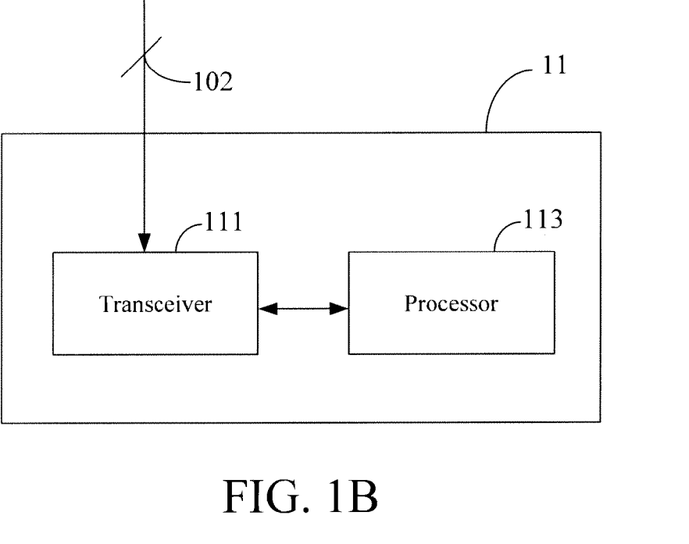
Figure 1C:
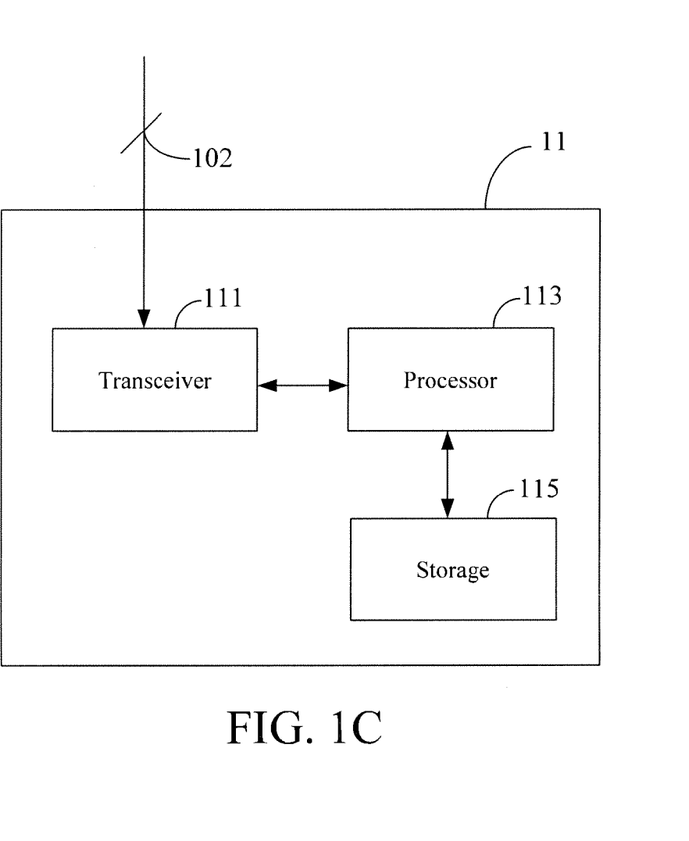

FIGS. 1A-1C depict a first embodiment of the present invention. A mobile apparatus 11 is a wireless communication enabled mobile apparatus, e.g., a mobile phone, a personal digital assistant (PDA) or a notebook computer. A nearby mobile apparatus 13 is a wireless communication enabled mobile apparatus equipped with a positioning device, e.g., a mobile phone, a PDA or a notebook computer. The positioning device of the mobile apparatus 13 accomplishes the positioning purpose by means of the GPS technology, the AGPS technology, the Wi-Fi technology, the GNSS technology or a combination thereof. The mobile apparatus 11 and the nearby mobile apparatus 13 set up a connection therebetween according to a wireless communication specification, which may be one of a Wi-Fi specification, a Worldwide Interoperability for Microwave Access (WiMAX) specification, a ZigBee specification and a Bluetooth specification.

The nearby mobile apparatus 13 acquires nearby positioning information through the positioning device thereof, and by transmitting a nearby signal 102 to the mobile apparatus 11, provides the nearby positioning information to the mobile apparatus 11. To be more specific, the nearby signal 102 carries the nearby positioning information, and the nearby positioning information is longitudinal and latitudinal coordinates of the nearby mobile apparatus 13.

Upon receiving the nearby signal 102, the mobile apparatus 11 estimates a nearby received signal strength of the nearby signal 102 according to the nearby signal 102. Then according to the nearby received signal strength and the nearby positioning information, the mobile apparatus 11 generates a host positioning information, which is longitudinal and latitudinal coordinates of the mobile apparatus 11. In detail, the mobile apparatus 11 acquires information of distance to the nearby mobile apparatus 13 by estimating a nearby received signal strength of the nearby signal 102, and then derives the possible longitudinal and latitudinal coordinates of itself from the distance information and the longitudinal and latitudinal coordinates of the nearby mobile apparatus 13. It shall be appreciated that, the nearby received signal strength may be obtained from a received signal strength indication (RSSI) or a received signal code power (RSCP), and the information of distance between the mobile apparatus 11 and the nearby mobile apparatus 13 may be readily derived from the received signal strength by those of ordinary skill in the art, so no further description will be made herein.

Further speaking, the mobile apparatus 11 comprises a transceiver 111 and a processor 113, as shown in FIG. 1B. The transceiver 111 is configured to receive the nearby signal 102 from the nearby mobile apparatus 13. The processor 113, which is electrically connected to the transceiver 111, is configured to estimate a nearby received signal strength of the nearby signal 102 according to the nearby signal 102 and generate a host positioning information according to the nearby received signal strength and the nearby positioning information.

Furthermore, the transceiver 11 may comprise multiple antennas which are configured to receive a radio frequency (RF) signal to generate the nearby signal. The processor 113 further generates the host positioning information according to characteristics of the antennas when receiving the RF signal (e.g., phase differences among the antennas when receiving the RF signal or directions of antenna beams), the nearby received signal strength and the nearby positioning information. In other words, in additional to sole use of the received signal strength between the mobile apparatus 11 and the nearby mobile apparatus 13, multiple antennas may be equipped so that the information of distance between the mobile apparatus 11 and the nearby mobile apparatus 13 is derived by using the antenna array and the received signal strength in combination.

The mobile apparatus 11 may further comprise a storage 115, as shown in FIG. 1C. The storage 115 is electrically connected to the processor 113 and stores a map file. The nearby positioning information corresponds to a position in the map file, and the host positioning information also corresponds to a position in the map file. As an example, the map file may be an off-line map or an on-line map, and positions to which the nearby positioning information and the host positioning information correspond are locations where the mobile apparatus 11 and the nearby mobile apparatus 13 are located in a city.

Figure 2A:
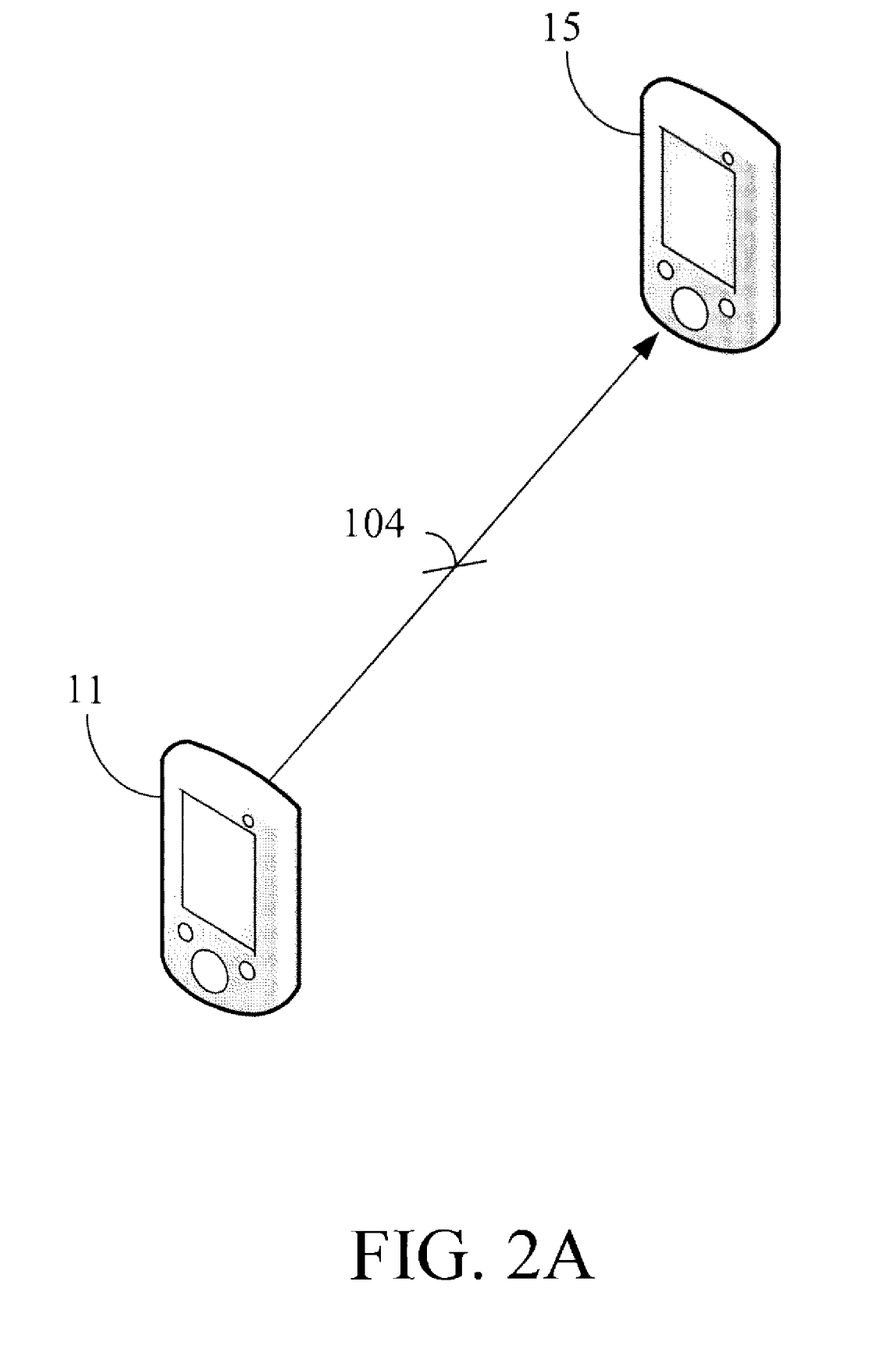
FIGS. 2A-2C are schematic views of a second embodiment of the present invention.
Figure 2B:
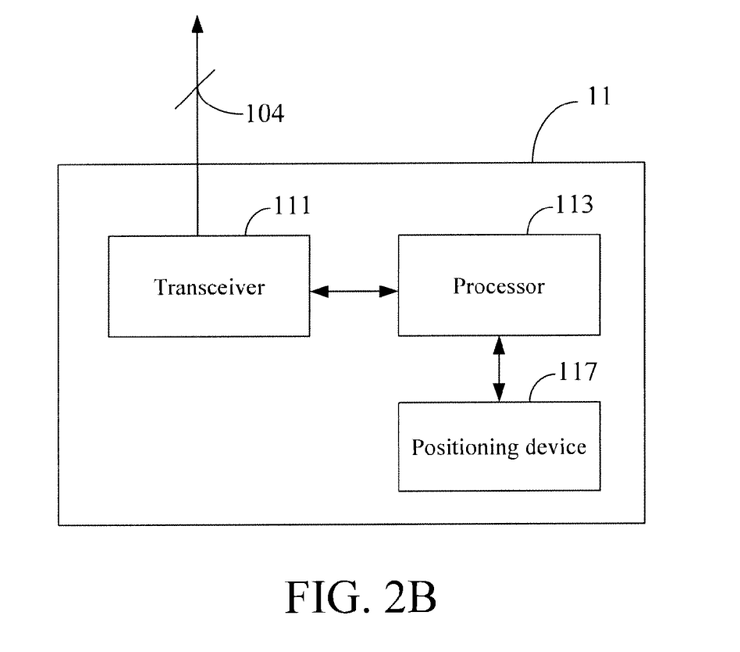
Figure 2C:
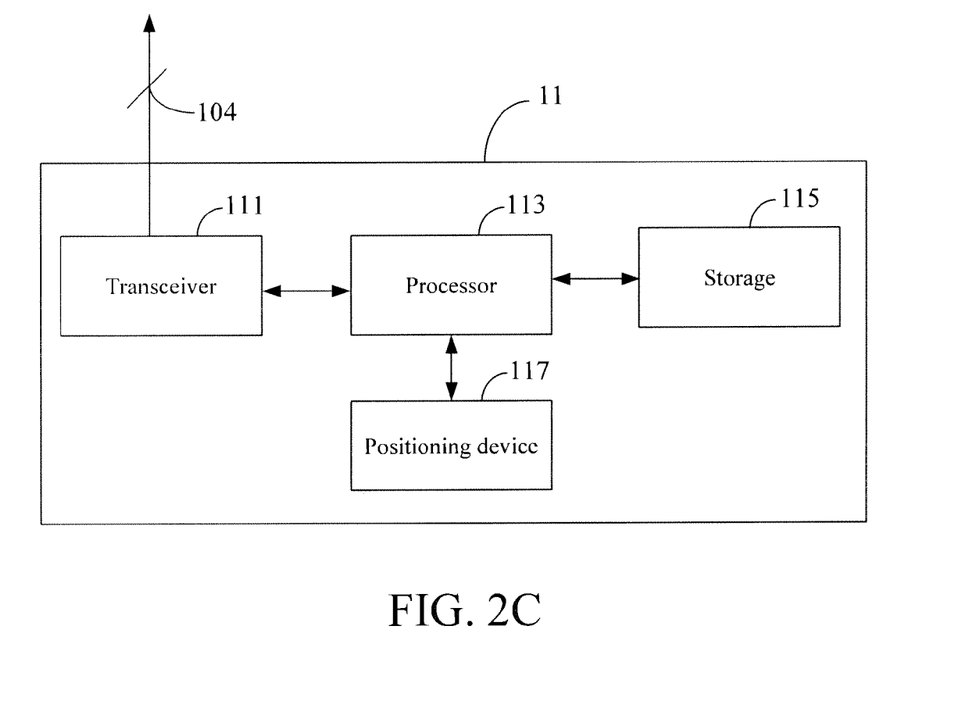

A second embodiment of the present invention is depicted in FIG. 2A to FIG. 2C. Unlike the first embodiment, the mobile apparatus 11 of the second embodiment further comprises a positioning device 117 electrically connected to the processor 113, as shown in FIG. 2B. Similarly, the positioning device 117 performs the positioning function through the GPS technology, the AGPS technology, the Wi-Fi technology, the GNNS technology or a combination thereof to generate a original host positioning information. The original host positioning information is longitudinal and latitudinal coordinates of the mobile apparatus 11.

After the original positioning information is generated by the positioning device 117, the processor 113 transmits a host signal 104 to a nearby mobile apparatus 15 via the transceiver 111. The mobile apparatus 11 and the nearby mobile apparatus 15 set up a connection therebetween according to one of a Wi-Fi specification, a WiMAX specification, a ZigBee specification and a Bluetooth specification. In the second embodiment, the nearby mobile apparatus 15 is a mobile apparatus that is not equipped with a positioning device but is wireless communication enabled, for example, a mobile phone, a PDA or a notebook computer.

Upon receiving the host signal 104, the nearby mobile apparatus 15 estimates received signal strength of the host signal 104 according to the host signal 104. Subsequently, the nearby mobile apparatus 15 generates a nearby positioning information according to the received signal strength and the original host positioning information carried by the host signal 104. Thereby, the nearby mobile apparatus 15 without having a positioning device can still acquire positioning information of itself via the mobile apparatus 11.

Furthermore, as in the first embodiment, the mobile apparatus 11 may further comprise a storage 115, as shown in FIG. 2C. The storage 115 is electrically connected to the processor 113 and stores a map file. The original host positioning information corresponds to a position in the map file.

Figure 3:
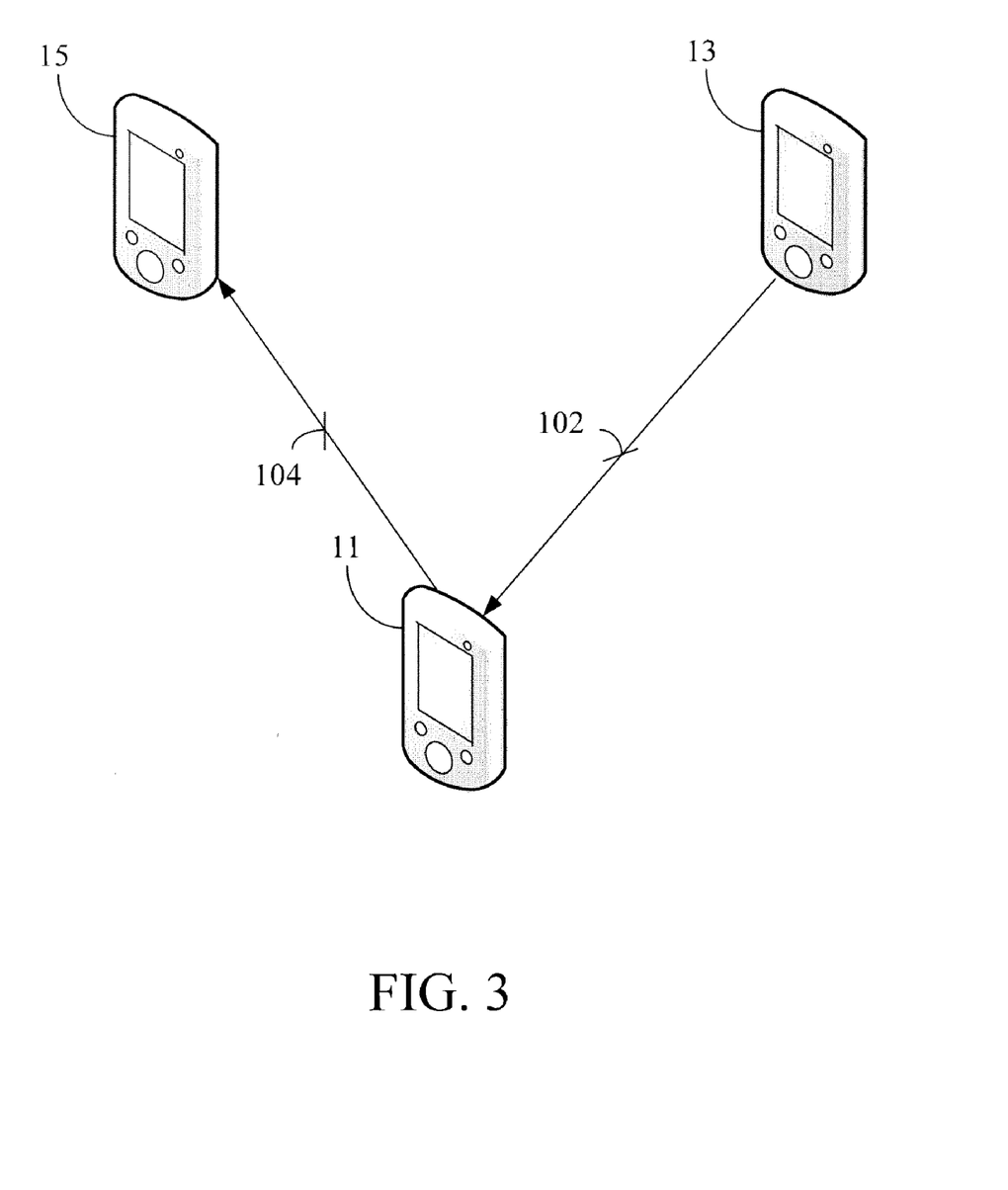
FIG. 3 is a schematic view of a third embodiment of the present invention.

A third embodiment of the present invention is depicted in FIG. 3. In the third embodiment, apart from receiving the nearby signal 102 from the nearby mobile apparatus 13, the mobile apparatus 11 further transmits the host signal 104 to the nearby mobile apparatus 15. The host signal 104 may carry the original host positioning information or the host positioning information.

Specifically, the mobile apparatus 11 may have the original host positioning information generated by the positioning device 117, or after receiving the nearby signal 102 from the nearby mobile apparatus 13, derive the host positioning information from the nearby positioning information of the mobile apparatus 13 and the received signal strength of the nearby signal 102. On the other hand, the host positioning information may be obtained by correcting the original host positioning information according to the nearby positioning information of the mobile apparatus 13 and the nearby received signal strength of the nearby signal 102. In detail, the original host position information refers to positioning information acquired by the mobile apparatus 11 using the positioning device 117, and the host positioning information refers to position information derived from the nearby positioning information of the nearby mobile apparatus or obtained by correcting the original host positioning information according to the nearby positioning information of the nearby mobile apparatus. Thereby, the mobile apparatus 11 of the present invention can not only accomplish the positioning by means of the nearby mobile apparatus, but can also accomplish the positioning by means of its own positioning device 117; meanwhile, the mobile apparatus 11 can assist in positioning of other nearby mobile apparatuses.

Figure 4:
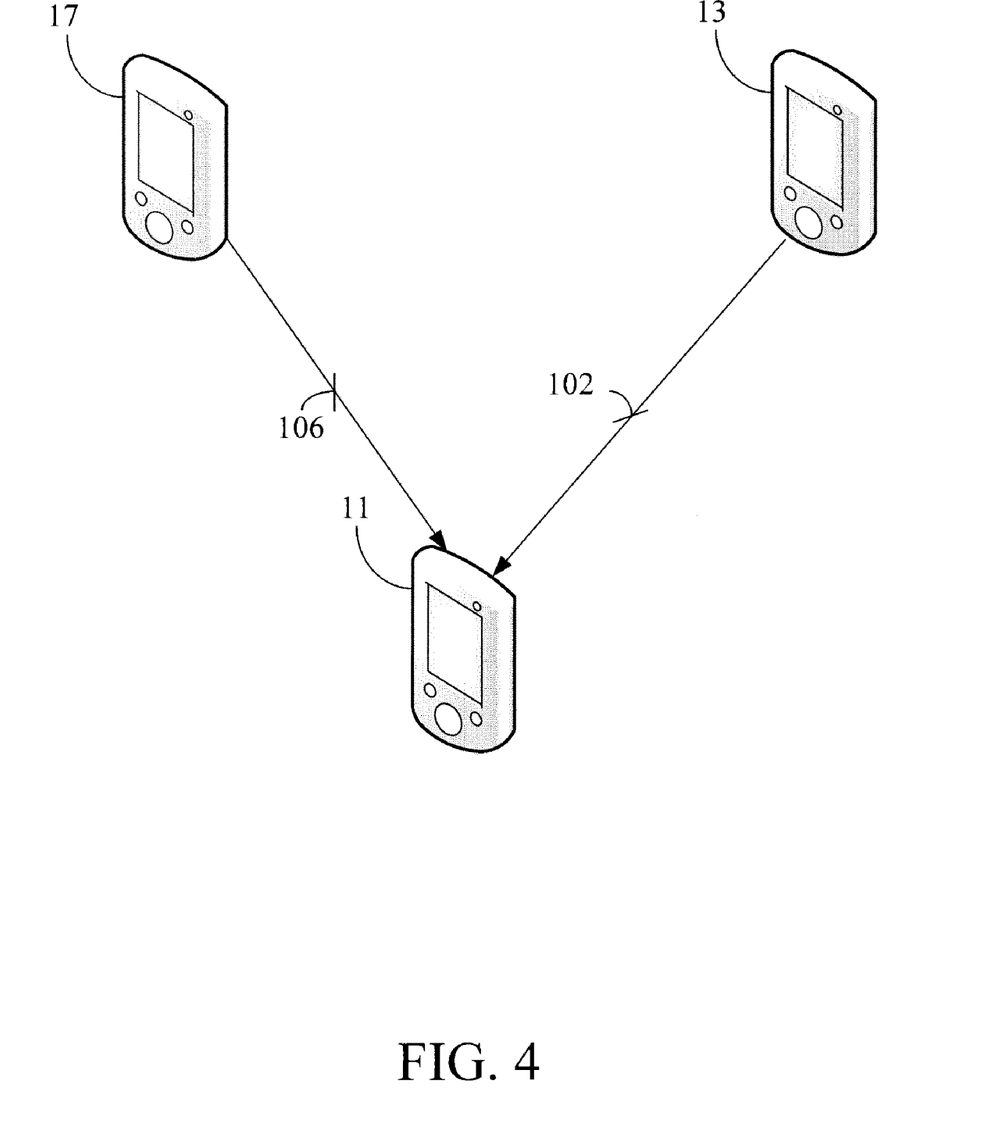
FIG. 4 is a schematic view of a fourth embodiment of the present invention.

A fourth embodiment of the present invention is depicted in FIG. 4. In the fourth embodiment, apart from receiving the nearby signal 102 from the nearby mobile apparatus 13, the mobile apparatus 11 further receives a nearby signal 106 from a nearby mobile apparatus 17. The nearby signal 106 carries the nearby positioning information of the nearby mobile apparatus 17. Similarly, the mobile apparatus 11 and the nearby mobile apparatus 17 set up a connection therebetween according to one of a Wi-Fi specification, a WiMAX specification, a ZigBee specification and a Bluetooth specification. In detail, the mobile apparatus 11 can derive the host positioning information from the nearby positioning information of the mobile apparatus 13 and the received signal strength of the nearby signal 102 as well as the nearby positioning information of the mobile apparatus 17 and the received signal strength of the nearby signal 106. It shall be noted that, in other embodiments, the mobile apparatus 11 may also derive the host positioning information from nearby positioning information of three or more nearby mobile apparatuses and received signal strength of nearby signals thereof; how the positioning is accomplished by means of three or more nearby mobile apparatuses will be readily appreciated by those of ordinary skill in the art based on explanations of the above embodiments, so no further description will be made herein.

Figure 5:
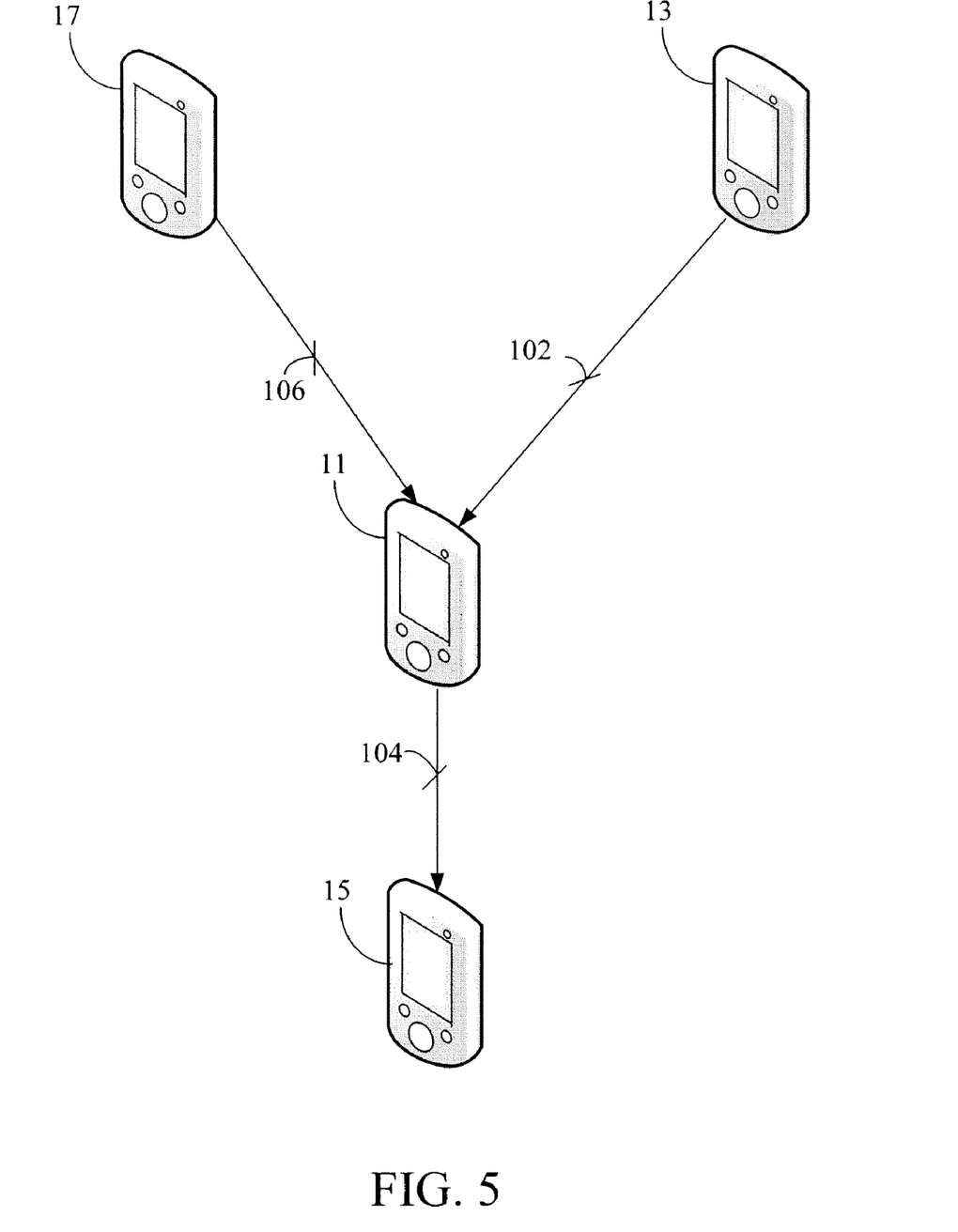
FIG. 5 is a schematic view of a fifth embodiment of the present invention.

A fifth embodiment of the present invention is depicted in FIG. 5. Unlike the fourth embodiment, in the fifth embodiment, apart from receiving the nearby signal 102 and the nearby signal 106 from the nearby mobile apparatus 13 and the nearby mobile apparatus 17 respectively, the mobile apparatus 11 further transmits the host signal 104 to the nearby mobile apparatus 15. The host signal 104 may carry the original host positioning information or the host positioning information.

Figure 6:
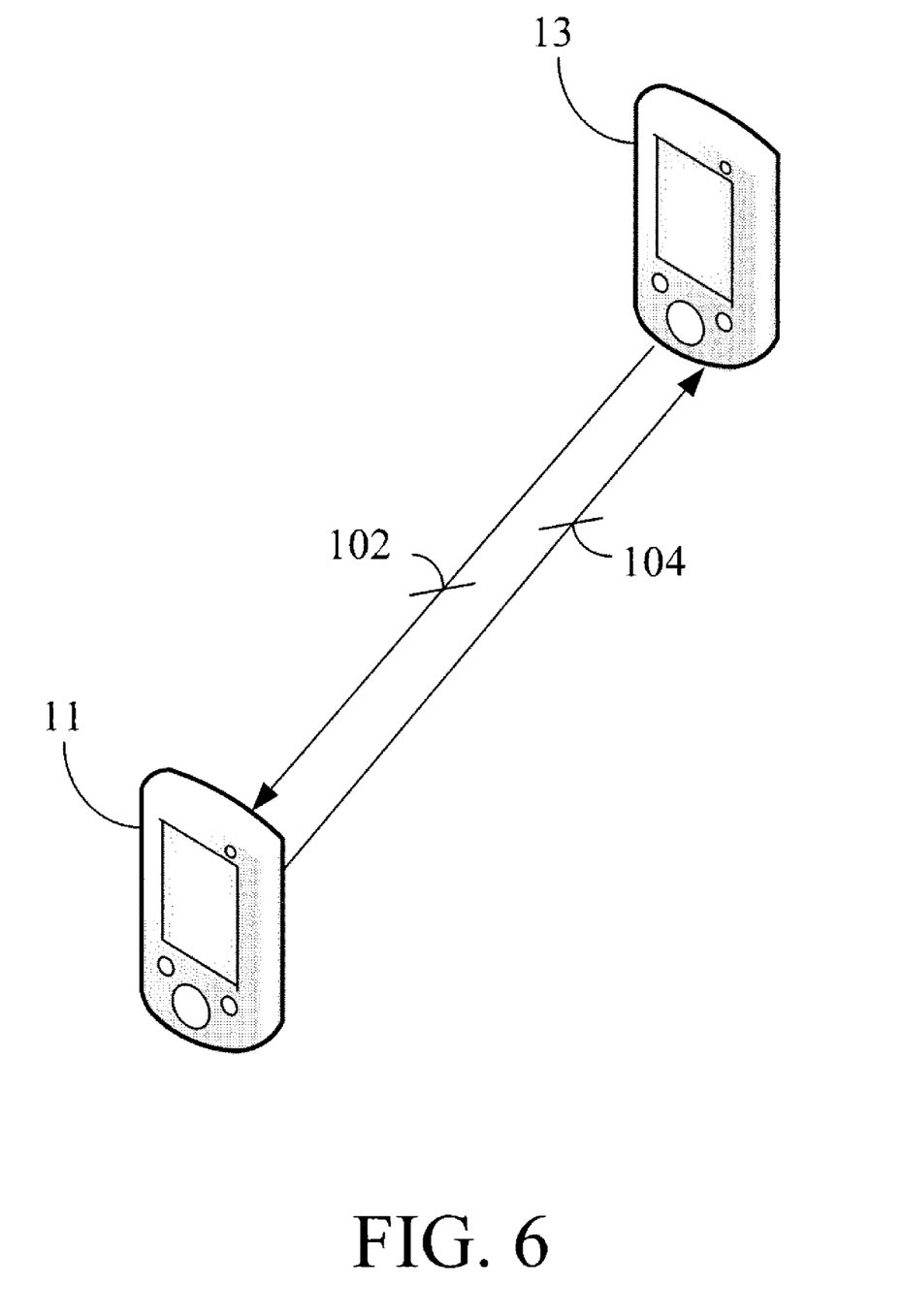
FIG. 6 is a schematic view of a sixth embodiment of the present invention.

A sixth embodiment of the present invention is depicted in FIG. 6. In the sixth embodiment, both the mobile apparatus 11 and the nearby mobile apparatus 13 have a positioning device and, according to a schedule, share positioning information with each other. In particular, the mobile apparatus 11 operates the positioning device 117 within a time period to generate original host positioning information, and transmits the host signal 104 to the nearby mobile device 13 to provide the original host positioning information. Then, in a next time period, the mobile apparatus 11 idles the positioning device 117 and receives the nearby signal 102 from the nearby mobile device 13 so as to generate the host positioning information according to the nearby positioning information carried in the nearby signal 102 and the received signal strength of the nearby signal 102. Then, the mobile apparatus 11 and the nearby mobile apparatus 13 repeat the aforesaid periods to provide original host positioning information and nearby positioning information to each other respectively.

In detail, when being used for positioning, the positioning device periodically updates the position information and operation of the positioning device causes considerable power consumption. Hence, the mobile apparatus 11 and the nearby mobile apparatus 13 can have the positioning information updating period extended (i.e., have idle time periods of the positioning device extended) by providing positioning information to each other according to a schedule, so as to deliver a power-saving effect. Additionally, the mobile apparatus 11 and the nearby mobile apparatus 13 may also correct their respective positioning information according to each other's positioning information to improve the positioning accuracy.

Figure 7:
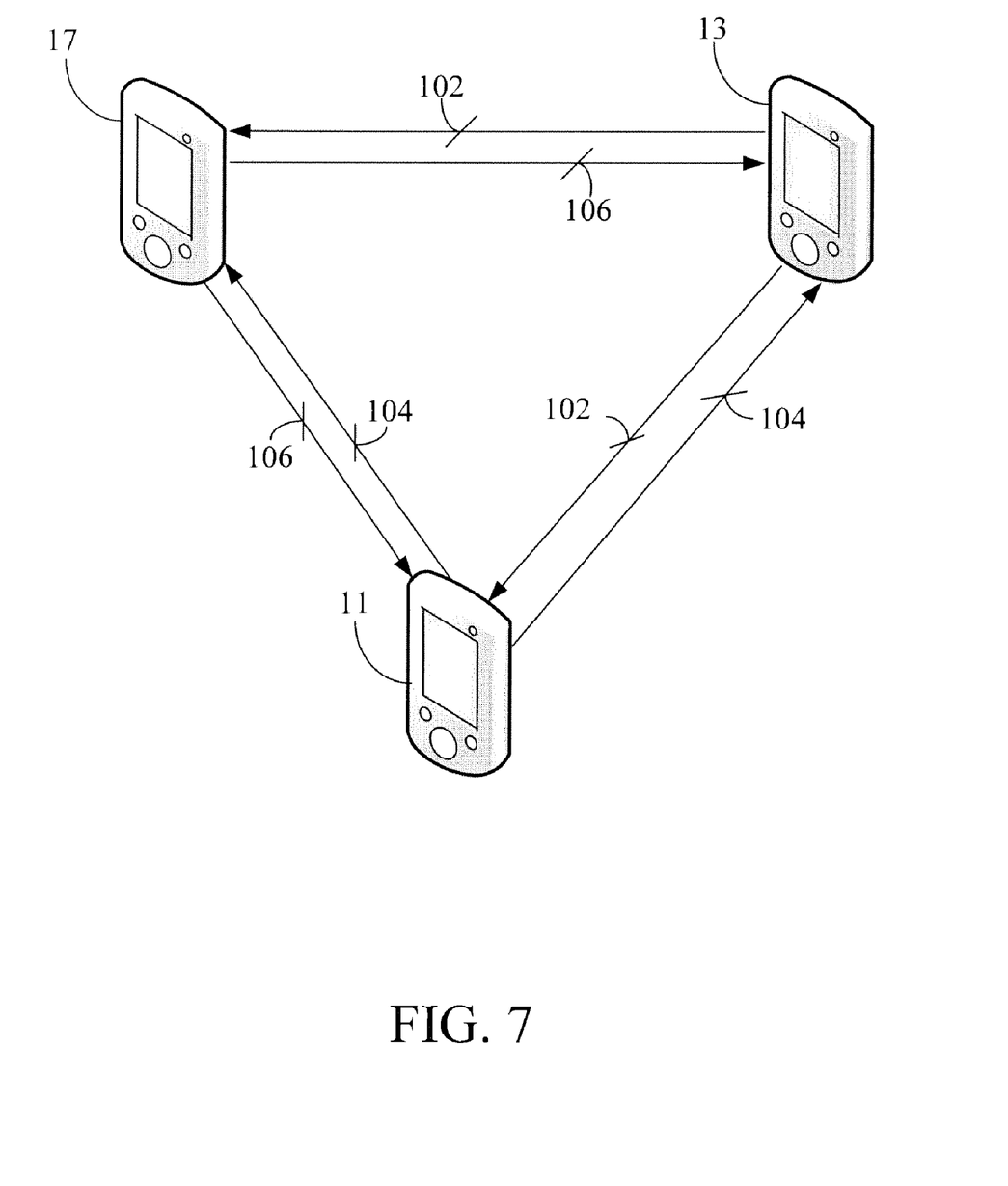
FIG. 7 is a schematic view of a seventh embodiment of the present invention.

A seventh embodiment of the present invention is depicted in FIG. 7. Similarly, in the seventh embodiment, all the mobile apparatus 11, the nearby mobile apparatus 13 and the nearby mobile apparatus 17 have a positioning device and, according to a schedule, share positioning information with each other. Thereby, the mobile apparatus 11 can not only have the positioning information updating period of the positioning device extended to deliver a power-saving effect, but also correct its own positioning information according to the positioning information of the mobile apparatus 13 and the nearby mobile apparatus 17 to improve the positioning accuracy.

According to the above descriptions, the mobile apparatus of the present invention can acquire positioning information of a nearby mobile apparatus from the nearby mobile apparatus to generate positioning information of itself or to correct positioning information generated by a positioning device equipped therein. On the other hand, the mobile apparatus of the present invention may also provide positioning information generated by the positioning device thereof to a nearby mobile apparatus for information sharing. Thereby, the mobile apparatus of the present invention can utilize positioning information of a nearby mobile apparatus to improve the positioning accuracy and efficiency, and meanwhile, share the positioning information with the nearby mobile apparatus according to a schedule to extend the positioning information updating period of the positioning device for power-saving purpose.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A mobile apparatus, comprising:
    a transceiver, being configured to receive a nearby signal from a nearby mobile apparatus, wherein the nearby signal carries a nearby positioning information;
    a processor electrically connected to the transceiver, being configured to estimate a nearby received signal strength of the nearby signal according to the nearby signal and generate a host positioning information according to the nearby received signal strength and the nearby positioning information; and
    a storage electrically connected to the processor and configured to store a map file,
    wherein the nearby positioning information is longitudinal and latitudinal coordinates of the nearby mobile apparatus and the nearby positioning information corresponds to a position in the map file, and wherein the host positioning information is longitudinal and latitudinal coordinates of the mobile apparatus and the host positioning information corresponds to a position in the map file.

2. The mobile apparatus as claimed in claim 1, wherein the transceiver comprises a plurality of antennas configured to receive the nearby signal, and the processor is further configured to generate the host positioning information according to at least one characteristic of the antennas when receiving the nearby signal, the nearby received signal strength and the nearby positioning information.

3. The mobile apparatus as claimed in claim 1, further comprising a positioning device, wherein the positioning device is electrically connected to the processor and configured to generate an original host positioning information, and the processor is further configured to generate the host positioning information according to the original host positioning information, the nearby received signal strength and the nearby positioning information.

4. The mobile apparatus as claimed in claim 3, wherein the positioning device generates the original host positioning information according to one of the Global Positioning System (GPS) technology, the Assisted Global Positioning System (AGPS) technology, the Wi-Fi technology, the Global Navigation Satellite System (GNSS) technology and combinations thereof.

5. The mobile apparatus as claimed in claim 3, wherein the transceiver is further configured to transmit a host signal to another nearby mobile apparatus, and the host signal carries the original host positioning information so that the another nearby mobile apparatus estimates a host received signal strength of the host signal according to the host signal and generates another nearby positioning information according to the host received signal strength and the original host positioning information.

6. The mobile apparatus as claimed in claim 3, wherein the transceiver is further configured to receive another nearby signal from another nearby mobile apparatus, the another nearby signal carries another nearby positioning information, and the processor is further configured to estimate another nearby received signal strength of the another nearby signal according to the another nearby signal and generate the host positioning information according to the nearby received signal strength, the nearby positioning information, the another nearby received signal strength and the another nearby positioning information.

7. The mobile apparatus as claimed in claim 3, wherein the transceiver is further configured to transmit a host signal to the nearby mobile apparatus, and the host signal carries the original host positioning information or the host positioning information so that the nearby mobile apparatus estimates a host received signal strength of host signal according to the host signal and generates the nearby positioning information according to the host received signal strength and the original host positioning information, or according to the host received signal strength and the host positioning information.

8. The mobile apparatus as claimed in claim 7, wherein the processor further idles the positioning device and receives the nearby signal from the nearby mobile apparatus according to a schedule, and operates the positioning device and transmits the host signal to the nearby mobile apparatus according to the schedule.

9. The mobile apparatus as claimed in claim 1, wherein the transceiver receives the nearby signal in accordance with a wireless communication specification, which is one of a Wi-Fi specification, a Worldwide Interoperability for Microwave Access (WiMAX) specification, a ZigBee specification and a Bluetooth specification.

10. The mobile apparatus as claimed in claim 1, wherein the mobile apparatus is one of a mobile phone, a personal digital assistant (PDA) and a notebook computer.

11. A mobile apparatus, comprising:
a positioning device, being configured to generate an original host positioning information;
a transceiver, being configured to transmit a host signal to a nearby mobile apparatus, wherein the host signal carries the original host positioning information so that the nearby mobile apparatus estimates a received signal strength of the host signal according to the host signal and generates a nearby positioning information according to the received signal strength and the original host positioning information; and
a storage electrically connected to the processor and configured to store a map file,
wherein the original host positioning information is longitudinal and latitudinal coordinates of the mobile apparatus and the original host positioning information corresponds to a position in the map file, and wherein the nearby positioning information is longitudinal and latitudinal coordinates of the nearby mobile apparatus and the nearby positioning information corresponds to a position in the map file.

12. The mobile apparatus as claimed in claim 11, wherein the transceiver receives the nearby signal in accordance with a wireless communication specification, which is one of a Wi-Fi specification, a WiMAX specification, a ZigBee specification and a Bluetooth specification.

13. The mobile apparatus as claimed in claim 11, wherein the transceiver is further configured to transmit the host signal to another nearby mobile apparatus so that the another nearby mobile apparatus estimates a received signal strength of the host signal according to the host signal and generates another nearby positioning information according to the received signal strength and the original host positioning information.

14. The mobile apparatus as claimed in claim 13, further comprising a processor electrically connected to the transceiver and the positioning device, wherein the transceiver is further configured to receive another nearby signal from the another nearby mobile apparatus, the another nearby signal carries the another nearby positioning information, and the processor is further configured to estimate another nearby received signal strength of the another nearby signal according to the another nearby signal and generate a host positioning information according to the original host positioning information, the another received signal strength and the another nearby positioning information.

15. The mobile apparatus as claimed in claim 14, wherein the processor further idles the positioning device and receives the another nearby signal from the another nearby mobile apparatus according to a schedule, and operates the positioning device and transmits the host signal to the another nearby mobile apparatus according to the schedule, and the host signal carries the original host positioning information or the host positioning information.

16. The mobile apparatus as claimed in claim 11, wherein the positioning device generates the original host positioning information according to one of the GPS technology, the AGPS technology, the Wi-Fi technology, the GNSS technology and combinations thereof.

17. The mobile apparatus as claimed in claim 11, wherein the mobile apparatus is one of a mobile phone, a PDA and a notebook computer.

* * * * *